United States Patent [19]

Feitler

[11] Patent Number: 5,759,229
[45] Date of Patent: Jun. 2, 1998

[54] METHOD FOR RECOVERING COBALT/ MANGANESE/BROMINE VALUES FROM RESIDUE CONTAINING USED CATALYST

[76] Inventor: David Feitler, 16201 Parkland Dr., Shaker Heights, Ohio 44120

[21] Appl. No.: 688,194

[22] Filed: Jul. 29, 1996

[51] Int. Cl.$^6$ ............................................ B22F 9/06
[52] U.S. Cl. ...................... 75/352; 75/625; 75/627; 420/434; 420/435; 420/590; 423/491; 423/500; 502/324; 502/326
[58] Field of Search ............... 502/28, 324, 326; 562/416, 414; 75/503, 414, 627, 625, 352; 420/434, 435, 590; 423/491, 500

[56] References Cited

U.S. PATENT DOCUMENTS

| | | | |
|---|---|---|---|
| 4,574,714 | 3/1986 | Bach et al. | 110/346 |
| 4,602,574 | 7/1986 | Bach et al. | 110/346 |
| 4,786,621 | 11/1988 | Holzhauer et al. | 502/28 |
| 4,876,386 | 10/1989 | Holzhauer et al. | 562/414 |
| 5,003,085 | 3/1991 | Behrend et al. | 549/232 |
| 5,177,304 | 1/1993 | Nagel | 588/201 |
| 5,358,549 | 10/1994 | Nagel et al. | 75/414 |
| 5,382,278 | 1/1995 | O'Connell et al. | 75/626 |

Primary Examiner—Melvyn Andrews
Attorney, Agent, or Firm—Alfred D. Lobo

[57] ABSTRACT

A process for recovering valuable components of a residue from a stream of used catalyst, discharged from a plant for the liquid-phase, homogeneously catalyzed oxidation of alkylaromatic compounds under pressure, to produce polycarboxylic aromatic acids. The residue containing mainly cobalt (Co) and manganese (Mn) compounds is injected into a molten metal bath in combination with enough oxygen gas to convert essentially all carbon in the residue mainly to CO. The residue may also be sludge from a pond in which the residue is stored. The Co content of the molten metal is determined by how much of the Mn in the residue is to be rejected from the molten metal. The Mn rejected is distributed between a slag overlying the molten metal and the effluent which leaves the bath. In the slag, the Mn is trapped as manganese oxide (MnO); in the effluent Mn leaves as manganese dibromide ($MnBr_2$). The alloy recovered is atomized to form a powder metal which is then reacted with acetic acid and hydrogen bromide to form the corresponding salts. Mn and bromine (Br) values from the slag and from the effluent are also recovered. Substantially pure Co may be recovered and exported, particularly if earthy residue from a sludge pond is processed to benefit the environment.

14 Claims, 4 Drawing Sheets

METHOD FOR RECOVERING COBALT/ MANGANESE/BROMINE VALUES FROM RESIDUE CONTAINING USED CATALYST

BACKGROUND OF THE INVENTION

This invention relates to the recovery of cobalt (Co), manganese (Mn) and bromine (Br) from the residue of a catalytic process, and thereafter the reconstitution of catalyst from desired recovered materials.

The problem addressed herein is as follows: An alkylaromatic polycarboxylic acid, e.g. isophthalic acid (IPA), terephthalic acid (TA), trimellitic acid (TMLA), 2,6-naphthalenedicarboxylic acid (2,6-NDA), and the like is produced and recovered from the product stream of a large-scale plant for the liquid-phase, homogeneously catalyzed oxidation of the appropriate precursor alkylaromatic compounds under pressure (referred to in the art as the "Amoco® Mid-Century® process"). The catalytic reaction is carried out with air in the presence of an acetic acid/water mixture which functions as a solvent for the reactants. The reaction generates a residue stream of undesired materials which entrains catalyst components. This residue comprises a mixture of oxygen-containing derivatives of the reactants and reaction products including partially oxidized and dealkylated oxidized mixtures of aromatic compounds, tars, and ring-brominated aromatic compounds, much of which residue is complexed with components of the catalyst used, namely Co—Mn—Br, or, Co—Mn—Br—Ce (cerium), or, Co—Mn—Zr (zirconium). The compounds include acetates, bromides and bromo-acetates of Co and Mn; a wide array of aromatic and polynuclear carboxylic acids, aromatic and polynuclear aldehydes; aromatic and polynuclear mixed carboxylic acid aldehydes, including ring-brominated aromatic compounds; and, unidentified Co and/or Mn complexes and salts of the anions of acetic acid, hydrobromic acid and any of the aforementioned aromatic carboxylic acids. Though the amount of this residue is relatively small, typically in the range from 0.1 to 25 weight percent of the polycarboxylic acid produced, though usually less than about 10%, the net amount of such residue produced annually in a commercial plant is so large that it is desirable to recover the metal components, specifically the Co and Mn, and the halogen component, namely Br. Reference to Br hereinafter refers to bromine in compounds such as HBr and manganese dibromide ($MnBr_2$), the specific form in which Br occurs being specified; reference to Mn refers to manganese and manganese in compounds such as manganese dibromide ($MnBr_2$), the specific form in which Mn occurs being specified. The object is to recover these components from the residue.

To date, this residue has been principally treated either by (i) incineration to provide flyash for further processing, namely, to recover its metal content, or, (ii) discharging to a residue pond notwithstanding the loss of the value of the Co, Mn and Br content in the resulting earthy residue, or the adverse environmental impact of doing so. The term "residue" is used hereinbelow to refer to both plant residue as well as earthy residue, one or the other being referred to specifically when both are not included.

Referring to FIG. 1 there is schematically illustrated the main steps of a currently used commercial process for recovering catalyst from the residue. As described in U.S. Pat Nos. 4,876,386 and 4,786,621 to Holzhauer et al, the organic matter in the residue is destroyed by incineration while the catalyst components are converted to an ash. This ash is difficult and/or expensive to convert to reusable forms of catalyst for the oxidation of methyl-substituted benzenes.

In greater detail, the residue stream is incinerated in step 2 to produce a mixed metal oxide flyash which is collected in step 3. Since not all the Co and Mn from the residue is transferred into the flyash collected, the remainder is lost in the incinerator's residue discharged to step 6. Collected flyash (from the incinerator in step 1) is washed with water in step 4 to remove the soluble salts and sodium bromide which are discarded (step 5). In the next step 7, the washed ash containing a major proportion (>50%) by weight of Co and Mn is converted to acetates and bromides of Co and Mn by digestion and extraction before being returned to catalyst inventory (step 9). Material not extracted from the washed ash is discarded (step 6). Catalyst is fed from storage (9) to the process (step 10). A portion of the catalyst from step 10 is recycled internally in step 11, being returned to storage of catalyst in step 9 for re-use in the liquid-phase oxidation reactor in step 10 or directly returned to the process, while the desired products of the reaction are separated and sent elsewhere for further processing. A purge stream from step 11 generates the residue stream 1. This residue is then incinerated to start the recovery and re-use process anew. As is evident, some portion of the metal content of the catalyst, typically from 30% to 40%, and depending upon the quality of the flyash and conditions for processing it, as much as 90% of the residue's metal content is lost. All the Br is inevitably lost as NaBr from this system.

In the process just described, the Co and Mn components not lost in step 3 are extracted from the flyash with aqueous acetic acid and by reducing them with hydrazine. This is done by refluxing with a 10% hydrazine solution in aqueous acetic acid. This recovery process results in the loss of a substantial portion of the Co and Mn. Despite the economic incentive (a) to recover substantially all of both, main metals (Co and Mn), and also bromine compounds from the residue, and (b) destroy the waste organic content of the residue, there is no suggestion in the prior art to do so, much less how to do so.

The alternative to incineration and treating flyash, namely discharging to a sludge pond, results over time in an earthy residue which represents a large recoverable accumulation of main metals Co and Mn, and the halogen Br in the form of bromine compounds. Discharging wastes to a pond often leads to contamination with earthy components, such as silica, alumina, clay and the like. This accumulation concurrently represents a valuable resource and, if recovered, would lead to restoration of a safe environment. I know of no single prior art process which can either, recover the valuable components of this earthy residue, or, those of the plant residue, or, those from both, together.

The process of my invention accomplishes the recovery of valuable components from both residue streams, destruction of organic residues and segregation of earthy components by charging these streams to a properly constituted bath of molten metal together with the correct amount of a molecular oxygen containing gas. The pertinent prior art for the application of molten metal baths to the destruction of hazardous wastes is summarized as follows:

Processes for the destruction of organic waste in a bath of molten metal, in the presence of oxygen, require maintaining a temperature high enough to convert the residue to oxides of carbon and to convert the metal component to a form which will dissolve in the melt. Such a melt having a viscosity no greater than 10 centipoise has been used to destroy toxic chemicals by injecting a greater than stoichiometric amount of oxygen into organic waste fed to the bath, as disclosed in U.S. Pat. No. 4,574,714.

U.S. Pat. No. 4,602,574 to Bach et al teaches the destruction of toxic organic chemicals by injecting them, together with an excess of oxygen, into a melt such as is used in a steel-making plant. The high carbon, low ferrous oxide slag, maintained above the iron melt, provides a surface for exothermic radical recombination (e.g. H+Cl→HCl) and a medium for sulfur or heavy metal scavenging (see col 3, lines 49–53).

In particular, U.S. Pat. No. 5,177,304 to Nagel teaches a method for converting organic waste into carbon dioxide ($CO_2$) in a bath of molten metals in which the melt exists in two separate phases. In such a melt, metals such as iron, chromium and manganese are present in a first phase, and metals such as copper, nickel and cobalt are present in a second phase above the first phase (see col 5, lines 33–60 and col 14 lines 14–18). To produce $CO_2$, the '304 process requires the use of more oxygen than is required to produce CO. The first molten metal phase could be Mn or manganese oxide, while the second molten metal phase could be Co or cobalt oxide. It is not evident how or why the teachings of the '304 patent should be modified to generate Co and Mn metals and oxides thereof; in particular, there is no suggestion, either that the metals may be recovered in proportions useful for the regeneration of catalyst for the Mid-Century process, or, that a Co/Mn melt should be purified to yield substantially pure Co.

U.S. Pat. No. 5,358,549 to Nagel et al teaches a method for converting inorganic waste and spent metal catalysts by directing a reducing agent, such as carbon, through the melt to thereby chemically reduce metal oxides; and the amount of reducing agent introduced is significantly in excess of the theoretical amount required to chemically reduce the metal oxide (see paragraph bridging cols 2 and 3). The improvement taught in the '549 patent over the prior art process, comprises using a molten metal bath containing a metal-containing first reducing agent which chemically reduces the component of the waste to form a dissolved metal-containing intermediate, and thereafter exposing the dissolved intermediate to a second reducing agent in the melt to cause the intermediate to dissolve in the melt for subsequent reduction of the metal component of the intermediate. The temperature of the melt is sufficient to cause the first reducing agent to chemically reduce the metal-containing component of the waste to form the dissolved intermediate. Co and Mn are both stated to be first reducing agents in the composition of the melt which is immaterial since it may include a solution or alloy of metals; oxides or salts, such as oxides or salts of the melt metals; more than one phase of molten metal; oxides or salts; or, elemental metal. Other first reducing agents identified are cadmium (Cd) chromium (Cr), copper (Cu), iron (Fe), potassium (K), molybdenum (Mo), sodium (Na), nickel (Ni), lead (Pb), sulfur (S), tin (Sn), tungsten (W) and zinc (Zn) (see paragraph bridging col 5, line 63 to col 6, line 10; and col 13, lines 28–33). After formation of the dissolved intermediate, the second reducing agent chemically reduces the metal of the dissolved intermediate at a rate sufficient to cause essentially all the dissolved intermediate formed to dissolve in the melt. (see col 2, lines 30–46).

Reference to using a melt of the metal to be recovered in the bath is found in the '549 patent where it states: "Metal recovery of non-volatile metals may be particularly advantageous in this invention where the principal metal of the waste, the first metal oxide, is the same as the bath metal, thereby affording a bath enriched in a recoverable metal. For example, molten copper can be employed as the bath metal for recovery of copper metal from waste streams highly enriched in the oxides of copper. In those cases where the free energy of formation of the oxide of the bath metal is higher than that of a metal contaminant present in the waste, it may be advantageous to use a sacrificial metal with a highly negative free energy of oxidation, relative to the first metal oxide." (see col 12, lines 38–50). No mention is made of recovering metals in an oxidizing environment.

The use of a molten bath in the prior art is based on choosing its physical properties to provide a desirable reaction medium for an oxidation or reduction reaction. While the scientific principles governing the conversion of organic waste into $CO_2$, CO, $H_2$ and water, in a melt of certain metals are known, there is no motivation or suggestion in the prior art to maintain a bath of molten Co for any useful purpose. One would not be led to choose such a bath for the disproportionation of the residue Co-containing organic compounds, or, Mn-containing organic compounds, or a mixture of both, for the specific purpose of recovering either or both metal components. There is no motivation to choose a de-watered residue containing Co and Mn compounds, obtained from the Mid-Century process, and react it with oxygen in a molten alloy of the same metals to regenerate the alloy. Nor is there any suggestion in the prior art that the ratio of Co and Mn metals in the alloy recovered may be controlled by temperature and/or the amount of oxygen used; nor that Mn should deliberately be rejected to slag from which it is recoverable as opposed to used as a ceramic.

Moreover, in all known processes for the recovery of reusable Co and Mn from a catalyst used in the Mid-Century process, a significant if not substantial portion of the Co, Mn and Br values of the catalyst in the residue is lost. And no process recovers both the process residues and the earthy residues.

The process of this invention is uniquely well suited to recover essentially all of the Co, Mn and Br values in both of these residue streams. By "essentially all" is meant that in excess of 90%, typically more than 95%, and preferably in excess of 99% of any one of the components (in this particular context) may be recovered. The process may be operated either to re-manufacture a catalyst at the same ratio as the incoming residue, or, at a different ratio suitable for catalyst, or, to purify a Co/Mn molten alloy ("melt") to produce substantially pure Co. By "incoming residue" is meant a single stream from a given Mid-Century process plant, or the combination of multiple streams from plants producing the same or different product, or streams of earthy residues, or streams of earthy residues and plant residue streams. By "substantially pure Co" is meant that the molten Co recovered is at least 90% pure with Ce, Zr and C contaminants, and for purposes of this disclosure is regarded as an alloy of Co/Mn containing less than 10 parts Mn per 100 parts (Co+Mn) by wt. Typically recovered Co is $95^+$% pure, and most preferably, for export, is $99^+$% pure with only trace contaminants. In each case, the proportion of Mn separated from molten Co is controlled by means of temperature together with a required amount of molecular oxygen-containing gas, preferably oxygen. Doing so, not only ensures the recovery of either Co/Mn melt having a desired ratio, or substantially pure Co, but also the recovery of essentially all the Mn and Br values.

A further advantage of this invention is that much equipment already existing in a facility for the recovery of Co and Mn values from flyash may be used to reformulate catalyst from the products of the present invention, thus decreasing costs.

SUMMARY OF THE INVENTION

It has been discovered that the composition of a non-ferrous melt of Co/Mn alloy generated from residue may be controlled by temperature in combination with an amount of oxygen chosen relative to the carbon content of the residue, both oxygen and residue being contacted with the molten alloy.

The foregoing discovery provides a solution to the problem of recovering essentially all, if desired, the cobalt (Co), manganese (Mn) and also bromine (Br) as HBr or $MnBr_2$ from residue of commercial and environmental significance, purged as a waste stream from a process for the oxidation of alkylaromatic.

More specifically, it has been discovered that a residue of used bromine-containing catalyst in the form of waste bromine-containing organic compounds in which Co and Mn are complexed with products and by-products of the Mid-Century process, may be reacted in a thermochemical reaction zone ("reactor") with oxygen, in a bath of molten Co/Mn alloy, to destroy the organics and regenerate Co/Mn alloy without adding a reducing agent or any additional organic carbonaceous matter, to recover essentially all the Co, Mn and Br values.

Cobalt is recovered essentially completely in the form of molten metal withdrawn periodically from the reactor either pure or as a manganese alloy. Cobalt is readily converted to catalyst component by reaction with and dissolving in acetic acid.

Manganese is recovered in three different streams. Like cobalt it is recovered in the form of molten metal alloy periodically withdrawn from the reactor. Mn withdrawn as metal alloy may readily be converted to catalyst by reaction with and dissolving in acetic acid. Mn in the residue may be either partially, or essentially completely rejected to a slag of MnO formed above the melt, and/or as manganese bromide ($MnBr_2$) in a gaseous effluent from the reactor. MnO is readily extracted from the slag as manganese acetate or bromide which is conventionally reformulated with acetates and bromides of Co/Mn to replenish fresh catalyst. $MnBr_2$ is readily recovered from the effluent gas stream. $MnBr_2$ is a catalyst component itself. Combining these three streams leads to essentially quantitative recovery of Mn.

Bromine values are essentially completely rejected from the melt. By "essentially completely rejected" is meant that in excess of 99% of the bromine is driven from the melt. Liberated HBr and manganese dibromide, and other metal bromides, if present, leave in the effluent. These products are collected in an aqueous scrubber and are directly useable to prepare catalyst by combining in proper amounts with the other process streams generated, thus recovering the bromine component.

The gaseous effluent of the process after recovery of Br values, contains CO and hydrogen together with small amounts of water and carbon dioxide depending on the exact conditions of operation. These effluents are used either for fuel value or for the synthesis of organic compounds.

It is therefore a general object of this invention to convert residue, either into an alloy of Co and Mn, or into substantially pure Co, either substantially continuously or batchwise, by reacting the residue with a controlled amount of oxygen in a molten bath consisting essentially of Co/Mn, Co/Mn/MnO or Co/MnO alloy, and vitreous slag. The bath is maintained in a reactor at a temperature above the melting point of the alloy but below its boiling point. The molten alloy contains essentially no contaminant oxides of Mn. The oxides of Mn reside essentially completely in an overlying slag layer. The actual stoichiometric amount of oxygen is that required to be used to convert all incoming carbon into carbon monoxide, and to convert Mn to MnO in the amount desired, with essentially no conversion of Co to cobalt oxide (Co) at a given temperature. By "essentially no conversion to CoO" is meant that less than 1% by wt of the combined Co and Mn in the residue is converted to cobalt oxide. By "essentially no contaminant metals" is meant that such metals as zirconium (Zr), and cerium (Ce) may be present in an amount less than 1 part per 100 parts by wt of the alloy, the Zr and Ce being essentially completely rejected into the slag as oxides. Typically Co is present in the molten Co/Mn alloy in an amount in the range from 5 parts to about 50 parts Co per 100 parts by weight of Co/Mn alloy, and the contaminants in the alloy include Ce, Zr and carbon (C), each contaminant present in an amount less than 1 part by weight.

It is a specific object of this invention to provide a process for recovering the Co and Mn metals in the residue, substantially quantitatively, provided Mn present in the slag, as well as that present in the gaseous effluent from the reactor are recovered. When Mn thus recovered is used to reformulate catalyst, the Co/Mn ratio of the catalyst may be essentially the same as that present in the residue fed to the reactor, if so desired.

It is still another specific object of this invention to provide a process for recovering substantially pure Co, substantially quantitatively and reject all Mn from the melt.

It is yet another specific object of this invention to provide a process for recovering essentially all the Br values in the residue.

It is also a specific object of this invention to provide a process with a unique benefit, namely, facilitating the economical recovery of the valuable main metals from earthy residue dredged from sludge ponds while restoring the environment. Bromine values may also be recovered from the earthy residue irrespective of whether plant residue is being processed. Since the Co, Mn and Br compounds recovered from added earthy residue will be in excess over that required to replenish depleted catalyst from a process generating plant residue, the excess Co, Mn and Br compounds may be used for other purposes.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
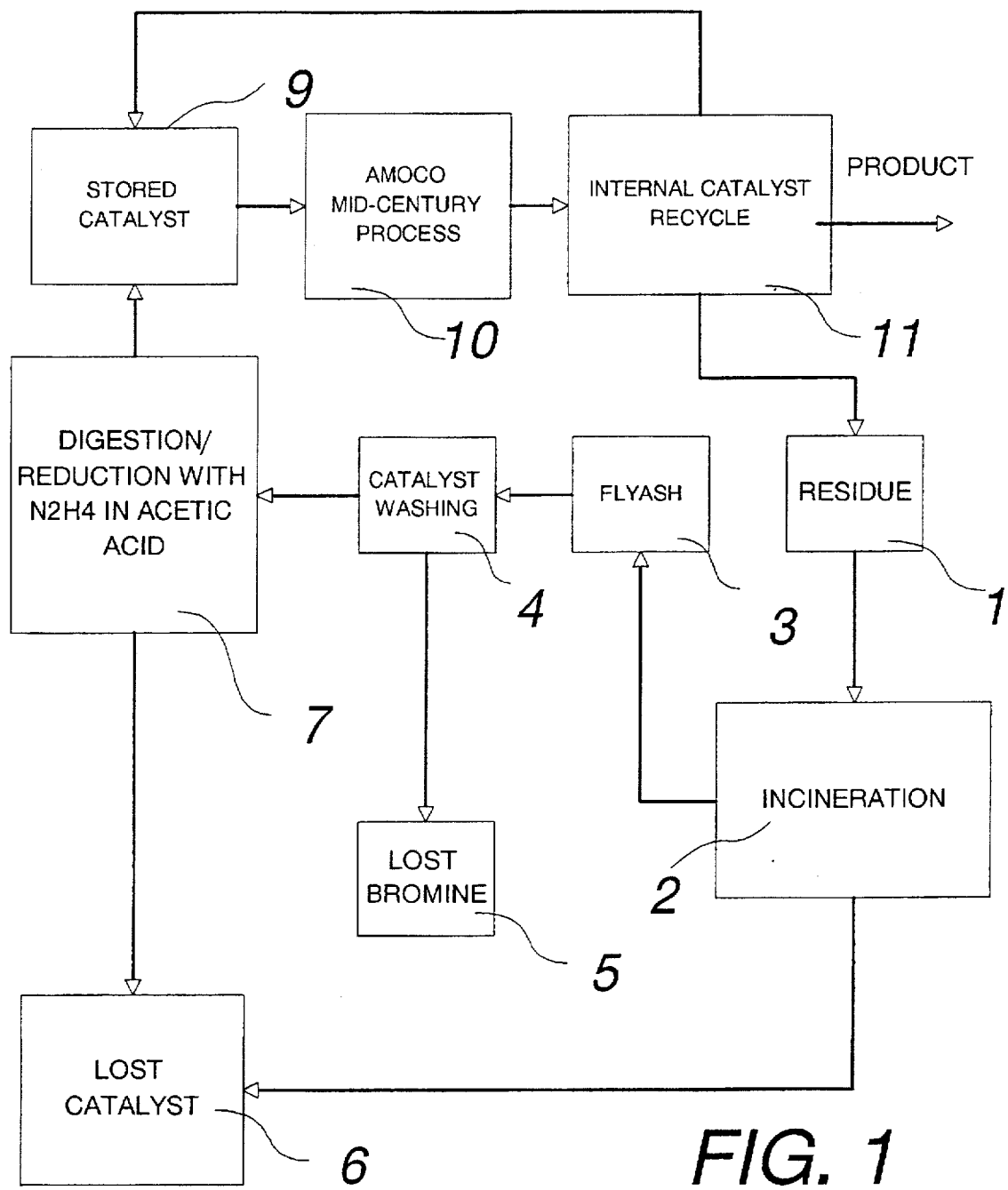
FIG. 1 is a flowsheet schematically illustrating the steps in a currently used commercial process for the recovery of Co and Mn values from flyash collected by incinerating residue obtained from the Mid-Century process.
Figure 2:
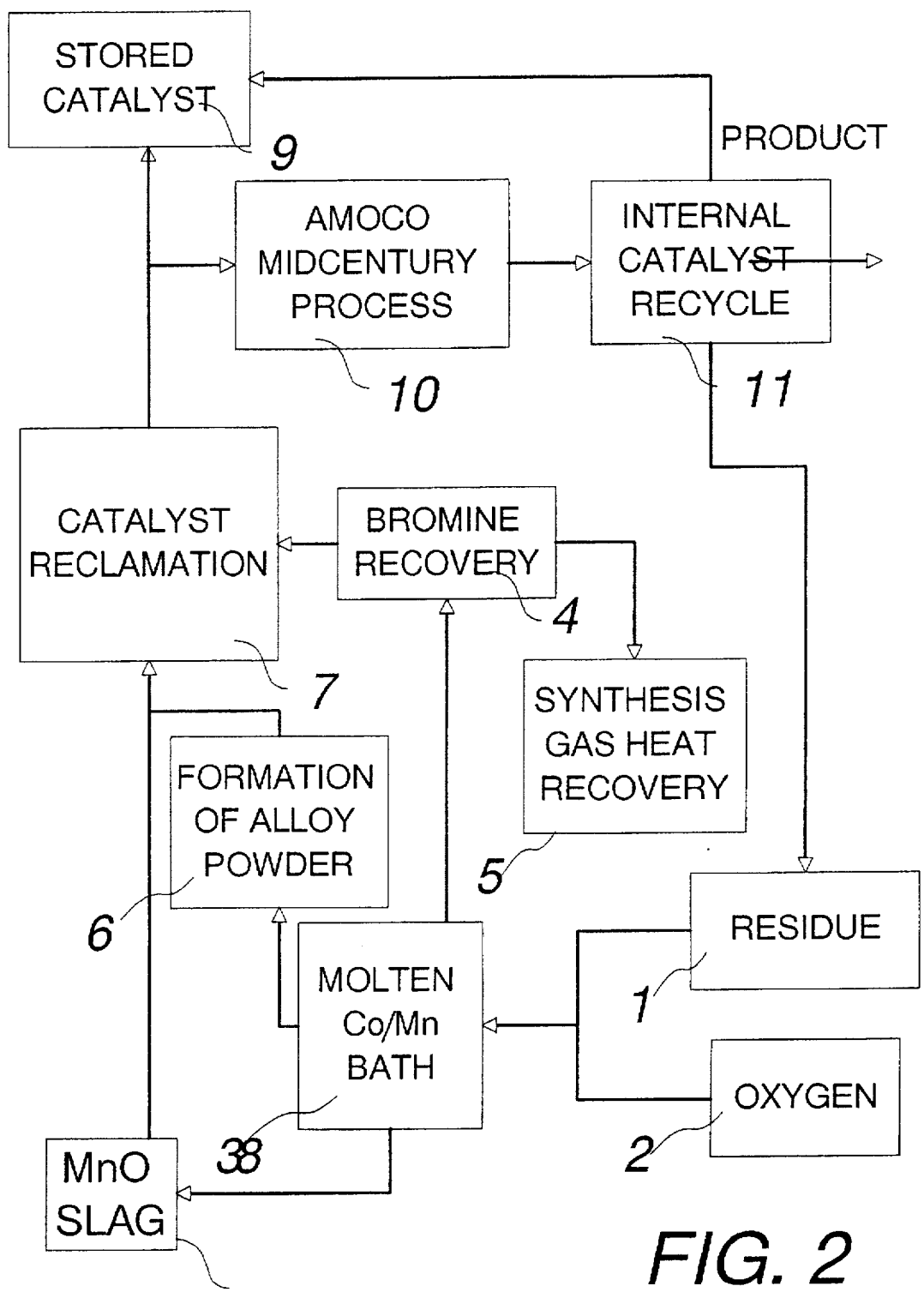
FIG. 2 is a flowsheet schematically illustrating the steps in the process claimed herein for the recovery of Co, Mn and Br substantially quantitatively from the residue obtained in the same Mid-Century process, and reformulating, recombining and reconstituting the effluent streams to regenerate the Co/Mn/Br catalyst. This same flowsheet also illustrates the steps in the process claimed herein to handle multiple plant waste streams, and to produce a desired ratio of Co/Mn in the melt, or even pure cobalt.

FIG. 2 schematically illustrates the main steps of a preferred embodiment of the novel process in which residue is collected and de-watered in step 1, then fed, along with a molecular oxygen-containing gas, preferably oxygen, from a source of oxygen 2, to a thermochemical reaction zone in which a reactor contains molten Co/Mn alloy (step 3). Residue is added to the melt and converted in the presence of the oxygen, to molten alloy and a slag layer of vitreous matter which floats on the surface of the melt (step 8). Vapors leaving the reactor as effluent gas include CO, $H_2$, and bromine-containing matter, mainly HBr and $MnBr_2$. The bromine containing components are collected in a scrubber or other device in step 4. Effluent from the scrubber consists essentially of CO and $H_2$ which are ducted away to step 5 where they are used for their fuel value, or for some other economically desirable purpose.

Molten alloy is withdrawn from the bath 3 and atomized to form a powder of the alloy which is collected in step 6 as a fine alloy powder. By "atomized" is meant that the melt is comminuted, typically by quenching with water, to a metal powder, having primary particles in the size range from about 1 μm to 500 μm. The 'powder metal' is then reacted with aqueous acetic acid, or hydrobromic acid, separately or combined, or combined with the products of bromine value recovery (step 4). The desired composition of re-manufactured Co/Mn catalyst may also be adjusted by addition of MnO recovered from the vitreous slag, or $Mn(OAc)_2$ or $MnBr_2$ solution prepared from the MnO slag in step 8. Re-manufactured catalyst is stored in step 9, preferably after filtering to remove insoluble materials including particles of unreacted alloy or carbon. Stored catalyst is fed, as required, to the reactor in the Mid-Century process in step 10 to synthesize the desired reaction product. The product is then recovered by conventional means, returning a portion of the catalyst to the process with an internal recycle in step 11, and purging a portion to a residue stream. A portion of the internally recycled catalyst may be returned to storage in step 9, and the residue is discharged to step 1 where the process is started anew. The process details and equipment used in the loop formed by steps 9, 10 and 11 which result in the discharge of the residue in step 11 and from distillation of the desired carboxylic acid, are all well known and set forth in one or more patents relating to the Mid-Century process. Some U.S. Pat. Nos. references are 4,162,991; 4,266,084; 4,311,521; 4,794,195; 4,876,385; 4,876,386; 5,081,290; and 5,181,290; and, the specific disclosures thereof relating to the process operating conditions which generate recoverable residue, are incorporated by reference thereto as if fully set forth herein.

Figure 3:
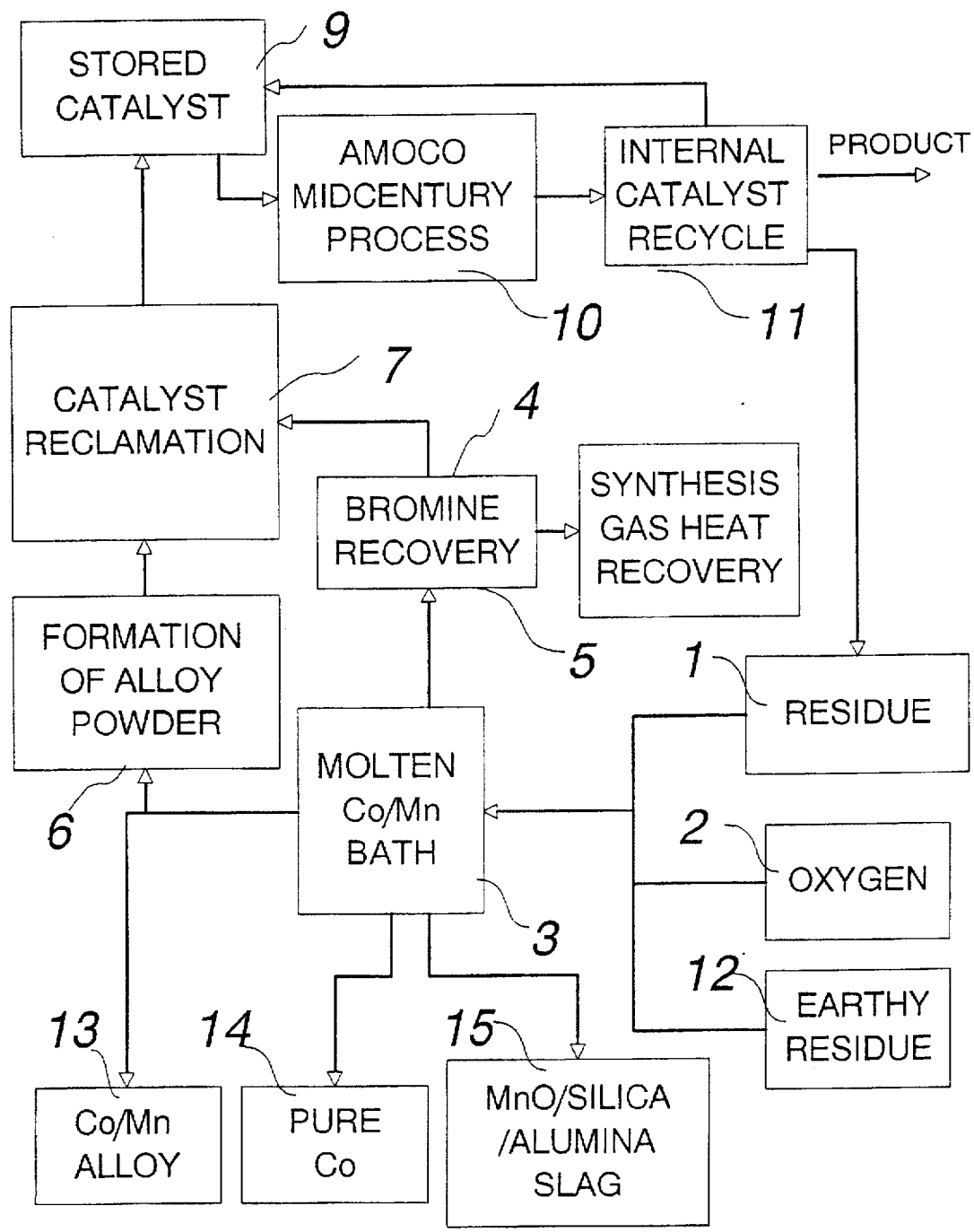
FIG. 3 is a flowsheet schematically illustrating the steps in the process illustrated in FIG. 2, when the process depicted therein is carried out in conjunction with converting earthy residue. A portion of the Co, Mn and Br produced is exported because it is in excess of that required to re-manufacture the depleted catalyst.

Referring to FIG. 3 there is schematically illustrated the processing of earthy residue in conjunction with plant residue. In addition to the process steps 1 through 8 described above in FIG. 2, earthy residue is processed along with plant residue as follows: Earthy residue is dredged from a sludge pond, dried in driers at 12, and the dried earthy residue fed to the reactor at 3 with oxygen from 2. Optionally, earthy residue may be combined with plant residue before drying both in step 1.

Accordingly, dried earthy residue from step 12 is fed to the reaction zone in step 3 and Br compounds recovered by scrubbing with any desired absorbent in step 4. As before, the CO and $H_2$ may be recovered for use in step 5. The build-up of alloy is prevented by withdrawing melt from the bath in step 13. As before, essentially pure Co may be withdrawn at 14 if an essentially pure cobalt melt is used in the reactor and excess oxygen is added to convert essentially all Mn in the residue which is not driven off as $MnBr_2$ vapor, to MnO which is withdrawn as a slag. Components such as silica, alumina and Magnesium oxide are also withdrawn as slag.

As before, HBr and $MnBr_2$ are recovered in step 4. If no more catalyst for storage is required, then excess Co/Mn alloy is withdrawn in step 13 for export, either as ingots of alloy or as powder alloy. If essentially pure Co is to be recovered in 14, then flow of oxygen is adjusted to convert all Mn in the melt to MnO, thus removing Mn from the melt as MnO. The MnO is rejected to the slag which is removed at 15.

Figure 4:
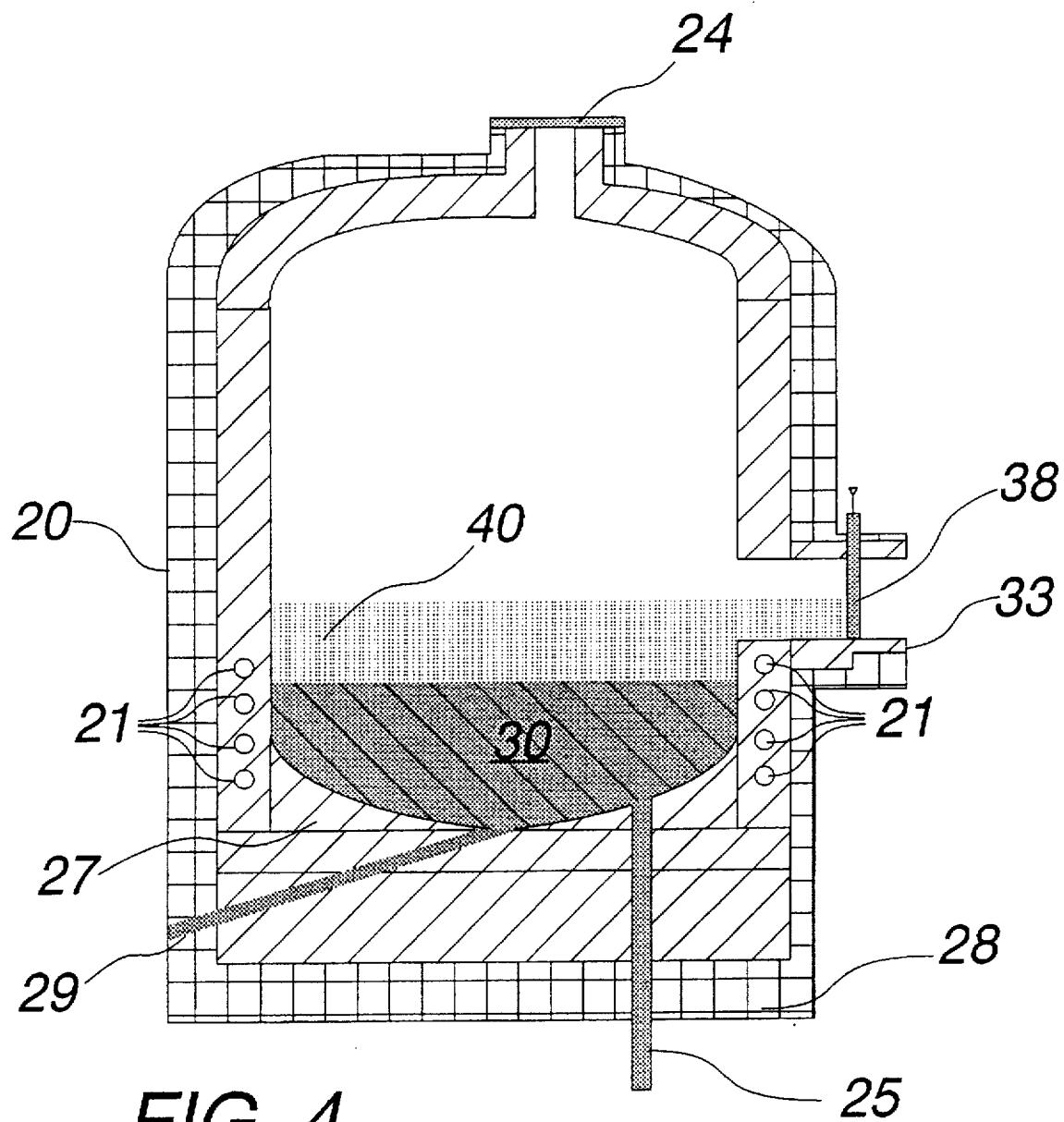
FIG. 4 diagrammatically illustrates a reactor of known design and construction to provide a bath of molten metal for the reaction medium.

Residue is also conventionally obtained in step 1 after the reaction product from step 10 is distilled. This residue, along with residue obtained from the internal catalyst recycle in step 11, is fed in step 3, into the molten alloy bath in a reactor schematically illustrated in FIG. 4, and referred to generally by reference numeral 20. The reactor 20 is a cylindrical induction furnace having a steel body 23 with induction coils 21 built into 75% alumina refractory-lined walls 22 of the reactor which is provided with a water-cooled gated slag discharge spout 33 equipped with a tightly fitting gate 38 which is opened periodically to discharge liquid slag 40. Preferably, mullite fiber insulation is packed between the outer surface of the refractory walls 22 and the inner surface of the steel body 23 of the reactor. Molten alloy 30 is held in the lower portion of the reactor; the level of the melt is preferably maintained below the slag discharge spout 33. The lower portion of the reactor preferably rests on a 95% magnesite ramming mix 27 which is packed between the lower steel outer surface of the reactor and a supporting structure of chromic oxide-alumina bonded 90% super-duty firebrick 28.

Hot gases from the reactor are led through an effluent discharge nozzle 24 through a pressure lock to a water scrubber (not shown). To feed the reactor 20, residue is led into it through the tuyere 25 through which residue mixed with oxygen is introduced into melt 30. If desired, oxygen may also be injected into the molten alloy bath through a separate conduit. An over-accumulation of molten alloy is prevented by withdrawing a portion through the molten alloy taphole 29.

Characterization of Plant and Earthy Residues, and Pretreatment thereof:

Residue may contain in the range from about 0.01% to about 45% by weight (wt) of Co and Mn combined, on a water-free basis, typically from about 2% to 10% by wt, and includes small quantities of other metals, particularly Ce and Zr, each typically present in an amount less than 1% by wt of dry residue, and other metals added deliberately as either catalyst promoters or unavoidably present as corrosion products. By "dry residue" is meant that the moisture content is less than 1% by wt. Typically, Co and Mn are together present in the residue in an amount in the range from 0.1% to about 20% by weight, on a water-free basis, and the residue is free of metal sulfides, phosphides or nitrides. Mn typically predominates in the residue, the weight ratio of Mn/Co being as much as 5:1, though in some instances Co predominates being in the range from about 1:1 to about 1:5.

Plant residue contains a mixture of components. For illustrative purposes, a composition of residue drawn from the patent literature is shown in table 1. It is understood that the specific residues will vary with the feeds and process conditions and the process of this invention is in no way limited by this particular example of residue composition.

TABLE 1

Residue of terephthalic acid manufacture on acetic acid and water free basis:

| Component | Wt % |
| --- | --- |
| Phthalic Acids | 19.7 |
| Benzoic Acid | 14.8 |
| Toluic Acids | 26.8 |
| Methyl Phthalic Acids | 2.6 |
| Trimellitic and Trimesic Acids | 4.3 |
| 4-Carboxybenzaldehyde | 9.1 |
| Tolualdehyde | 0.4 |
| Benzaldehyde | 0.004 |
| Terephthaldehyde | 0.2 |
| Methylbenzyl acetate | 0.02 |
| Formyl Acetate | 0.1 |
| Benzyl Benzoate | 0.07 |
| Phthalide | 2 |
| Co-Products | 4.2 |
| Cobalt Acetate | 4.5 |
| Manganese Acetate | 8 |
| Bromine | 2.2 |
| Iron | 0.09 |
| Sodium | 0.3 |
| Trace Metals | 0.02 |

Preferably, this residue is dried to remove water prior to injection into the molten Co/Mn or Co bath. The preference for a dried feed is economic, in that there is a cost penalty attached to heating water.

The components of earthy residues from sludge ponds are similar in composition to the plant residues from which they come, except for the contribution of the earth, if the pond is not lined, or the liner is damaged. Sludges will vary widely in composition depending on the age of the plant, the time the residue is held in the pond and any treatments to which the pond water or process effluent stream is subjected. The earthy residue will also contain biomass of varying composition and in general, fewer of the organic components described in Table 1. In addition, clays, binders, floculants and settling agents may also be present, these being determined by local conditions. Unlike other competing processes, recovery of Co and Mn in the process of this invention is largely insensitive to the additional contaminants introduced by clays, binders and floculants. Typical impurities introduced are $SiO_2$, $Al_2O_3$, MgO, and Fe in the forms they may be present in clays, binders and floculants. $SiO_2$, $Al_2O_3$, and MgO will all partition to the slag under the reaction conditions of this process.

Although not critical to this invention, it is preferable that the sludge be dried before addition to molten bath. Drying may take place separately from the plant residue stream, or the streams may be consolidated and dried.

The Nature of the Melt and Operating Conditions:

To operate the process, the reactor is charged with any convenient form of Co and Mn metals in proportions to produce a Co/Mn alloy having about the same ratio of Co:Mn as is expected to be formed when the melt reaches equilibrium with a feed of residue from the Mid-Century process. The desired ratio of Co/Mn in the molten alloy is obtained by rejecting a desired amount of Mn (i) as manganese oxide (MnO) to slag overlying the alloy; and (ii) into an effluent from the bath, the amount of Mn rejected being sufficient to yield an alloy containing Mn in the range from about 0.01 part to about 500 parts per 100 parts (Co+Mn) in the alloy. The initial heating of the charge is effected by the induction coils. Alternatively, a hot charge may be generated by any other suitable means such as in an electric arc furnace from which molten alloy is transferred to the reactor.

Once the charge is melted and reaches a temperature above the melting point of the Co/Mn alloy to be formed, residue in combination with oxygen gas is injected into the melt. The temperature of the melt is allowed to increase until the desired temperature of the melt in the operating range from about 1245° C. to about 2500° C., preferably from 1500° C. to 2350° C., is reached. No additional carbonaceous matter is required to be added to the residue to satisfy the chemical needs of the thermochemical reaction.

The heat energy in the molten alloy incites disproportionation of the organic moieties in the residue, converting them to CO and $H_2$ while the Br is liberated mainly as HBr and $MnBr_2$ gases.

The thermochemical reaction may be either exothermic, endothermic, or neutral, depending upon the amount and composition of the carbonaceous matter in the residue, when a typical water-free residue is fed to the reactor, and the amount of oxygen. If endothermic, additional heat required to maintain the temperature of the bath may be supplied by electricity in the induction coils, or by introducing a fuel directly in the bath for the sole purpose of maintaining its temperature. Such fuel may be provided with natural gas, propane or any other sources of heat energy from other plant vent or waste streams (such as brominated organic compounds derived from vent streams) which are less expensive than electricity, and are unrelated to and independent of the chemical conversion of residue into Co, Mn and Br compounds.

Once the reactor is in operation, a wide range of ratios of Mn/Co may be fed in the residue without sacrificing the ability to tailor the ratio of Mn/Co in the molten bath. If the bath is found to have a higher Mn content than is desired, excess oxygen is used to remove as much Mn as is necessary. On the other hand, while normally there is no reason to increase the Mn content of the bath relative to the Co present, it may be done by adding MnO or Mn metal to the residue.

It is critical that the molten metal in which the residue is to be converted to substantially pure Co, be substantially pure Co above 1495° C., preferably from 1500° C. to 2500° C.; thus, in excess of 90% pure Co, and as high as 99.99% pure Co, based on Co/Mn content, is recovered. When the molten metal to be recovered is alloy in the range from about 1/4 to 9/1 based on Co/Mn content, the molten metal is Co/Mn alloy above 1245° C., preferably from 1500° C. to 2350° C. Thus, depending upon the metal to be withdrawn, the Co/Mn content of the molten metal may range from about 1/4 to 9999/1. Typically, both Co and Mn are replenished in the bath when sufficient oxygen is fed to convert the residue to CO, $H_2$, HBr, and metal bromides which leave the bath in the vapor phase, but without forming oxides of Co in the molten metal, and such oxides of Mn as are formed are rejected to the slag. A Co/Mn alloy containing essentially no bromine compounds, is recovered for reuse. The Co/Mn alloy most typically withdrawn has a ratio of Co/Mn is in the range from about 1:1 to about 1:3.

To recover Co and Mn in an alloy in which the ratio of Co/Mn is the same ratio as that in the residue fed to the molten bath, it is not only essential that an actual stoichiometric amount of oxygen be used, but also that $MnBr_2$ be recovered from the effluent. If desired, substantially pure cobalt may be recovered as described below.

Since the carbonaceous content of plant residue is converted mainly to carbon monoxide and hydrogen and the residue contains less than 1% by wt of metals other than Co and Mn, accumulation of slag is slow except when conditions are deliberately chosen to reject all or part of the Mn in the residue into the slag layer. Accumulation of slag is expected when earthy residue is used.

The reactor may be operated under either atmospheric, or superatmospheric pressure in the range from more than 1 up to about 20 bar (atmospheres), preferably in the range from 1 to 10 bar, the reactor being designed and constructed to operate under the conditions chosen.

The reaction is run under conditions whereby the reactants are exposed to process conditions for sufficient time to ensure complete reaction. A numerical criterion for such time is defined as the rate at which cobalt is added divided by the total mass of the metal phase of melt. This measure corresponds to the standard definition of "weight hourly space velocity" and is hereafter referred to as WHSV. Suitable ranges of operating conditions are in the range from $0.1\ hr^{-1}$ to $1\times 10^{-5}\ hr^{-1}$, preferably in the range from about $10^{-2}\ hr^{-1}$ to about $10^{-4}\ hr^{-1}$.

Stoichiometry:

Temperature and oxygen feed rates may be used to control the chemical composition of the bath and effluent. If, as is generally desired, low carbon levels in the melt are to be obtained, higher temperatures are preferred, as are higher amounts of oxygen. If all the Mn fed is to be retained in either the melt or as vapor phase $MnBr_2$ then some carbon, in the range from 0.1% to 5% by weight, typically 0.5% to 2%, is allowed to build up in the metal alloy. If 95+% purity Co is to be removed from the molten phase, then sufficient oxygen is used to drive the reaction to achieve that purity. Since all desired materials can be recovered irrespective of their distribution in the molten alloy, slag and effluent vapor, the choice of operating conditions and subsequent product distribution is a matter of local economic preference.

The stoichiometry of oxygen addition takes into account the above considerations and balances other needs as well. The stoichiometric amount of oxygen is the amount of oxygen that is required to convert all carbon present to carbon monoxide only. This stoichiometric amount of oxygen does not include oxygen used to convert carbon to carbon dioxide, or, to convert metal to metal oxide, or, to convert hydrogen to water.

This stoichiometric amount of oxygen takes into consideration oxygen, or oxygen equivalents, in the incoming residue. The amount of divalent metals introduced into the bath, except those which leave the system in the vapor phase as bromide compounds, count as oxygen equivalents. The organic residues of the Mid-Century process typically contain a large amount of oxygen, the carbon to oxygen (C/O) ratio being in the range from 8/4 (single ring) to 14/1 (fused rings); e.g. benzaldehyde is 7/1; benzoic acid is 7/2; methylnaphthaldehyde. The C/O ratio in earthy residues will vary widely, depending upon the source of each, and are to be accounted for.

If it is desired to recover Co/Mn alloy with a ratio different from that of Co/Mn in the residue fed, part or all of the manganese may be removed provided the amount of oxygen is increased sufficiently to react with the amount of Mn to be rejected as MnO.

Finally, if additional fuel is used solely to maintain temperature in an otherwise endothermic system, then its carbon and oxygen content is also to be accounted for.

The stoichiometric oxygen required may be expressed in the following equation:

$$\text{Moles } O_2 \text{ gas to be added} = \{C_{tot} - O_{tot} + Mn_{ox} - Co^{+2} - Mn^{+2}\}/2$$

where $C_{tot}$=total moles of carbon fed, including any carbon in added fuel;

$O_{tot}$=total atom equivalents of oxygen in the feed;

$Mn_{ox}$=moles of Mn to be rejected as oxide;

$Co^{+2}$=divalent Co in the residue; and, $Mn^{+2}$=divalent Mn in the residue to be retained in the bath and not rejected as either MnO or $MnBr_2$ in the vapor phase.

Reactor Design and Construction:

The design and construction of a suitable reactor for use in this process is disclosed in U.S. Pat. Nos. 5,191,154; 5,301,620; 5,358,697; 5,396,850; 5,433,572; 5,435,982; 5,436,210, and 5,491,279 and in references cited therein, which patents are incorporated by reference thereto as if fully set forth herein. The design and construction of a reactor to carry out the claimed process forms no part of this invention.

Integration into an Existing Mid-Century Plant:

This process offers numerous opportunities for integration into existing plant operations, both supplying and consuming waste heat through heat exchange, and offering $CO+H_2$ as either fuel for heat recovery, or, for a synthesis gas ("syn gas") feed for chemical reactions. Integration of this invention into the general operation of an aromatic oxidation plant is within the skill of engineers who design and construct chemical plants.

Recovery and Application of Materials from the Molten Bath:

Catalyst is re-manufactured by first atomizing the molten metal to produce a powder metal then reacting the powder metal with glacial or aqueous acetic acid or (glacial or aqueous) acetic acid/hydrobromic acid mixtures, or appropriate acidic streams containing manganese dibromide, or any combinations of the foregoing, at a temperature in the range from 80° to 200° C. to produce the metal acetates. HBr may be added in the amount desired.

Numerous methods for production of powders of metals are taught in "Atomization of Melts" by Andrew J. Yule and John J. Dudley published by Oxford Science Publications, Oxford, England. The powder metal is preferably produced with a metal powder generating system marketed by Atomising Systems Limited, Sheffield, England. An alternative is to recover the alloy in the form of ingots of Co/Mn alloy or pure cobalt, particularly if earthy residue is being processed for export, or as solid particulate free metal, obtained directly from the melt.

Recovery of MnO from the slag:

Irrespective of how slag is tapped, either periodically or continuously, the MnO is recoverd by conventional leaching. The liquid slag is comminuted to produce a powder slag by any conventional means, preferably by atomization, in a process analogous to that for atomizing molten alloy. The powder slag preferably has an average particle diameter in the range from 1 μm to about 500 μm. Acidic leaching of the powder is effected by contacting it with either HBr or acetic acid under conditions which produce the corresponding salts; basic leaching is effected with ammonium hydroxide.

Recovery of Mn and Br values from the Vapor Phase which contains "Syn Gas":

The Br and Mn values transported in the vapor phase are preferably recovered by any conventional unit operations for removing materials from the vapor phase. Such unit operations include condensation, desublimation, quenching and scrubbing the effluent gas with water, or dilute acetic acid or hydrobromic acid. A scrubber will typically be operated in a recirculating mode resulting in a scrubbing solution approaching equilibrium concentrations of $MnBr_2$ and HBr. These operations may be carried out under atmospheric or superatmospheric conditions up to 20 bar, and elevated temperature up to 250° C., such as are optimum for such processes. Volumes and purge rates of such a system will be chosen to facilitate recombination of the streams at desired catalyst concentrations in the range from about 1 to 20% by wt of metal.

Depending upon the desired portion of Mn to be retained in the molten alloy, the amount of Mn discharged into the slag as MnO and into the effluent as $MnBr_2$, will vary from 0.01 part to 99.99 parts of Mn per 100 parts of Co/Mn alloy. Essentially all the $MnBr_2$ in the effluent is recovered, preferably quantitatively, and combined with Mn values recovered in the slag.

The thermal energy (BTU content) of the remaining effluent gases, namely CO and $H_2$ (syn gas) after the bromine content is removed may be recovered by employing a conventional gas-fed boiler. The energy content may also be converted directly to electricity by a device such as a fuel cell. If the syn gas is sufficiently free from deleterious impurities, it may be used as feed for the synthesis of numerous chemical compounds, typically methanol and acetic acid.

Catalyst Reconstitution:

The primary source of material to reconstitute catalyst is the molten metal withdrawn from the bath. It is preferred to reduce the size of solid metal particles as disclosed above, to facilitate conversion to metal salt at a relatively lower temperature and pressure than would be required with larger particles, because of the higher surface area of the smaller particles. While the active catalyst is generally considered as a mixture of Co/Mn and HBr or bromide salts, and may be returned as such, the bromine value recovered may be managed separately. In these cases the reconstituted catalyst will consist essentially of Co and Mn acetates.

Excess Recovery:

Since Co, Mn and Br values derived from earthy residue may be in excess of that required for catalyst to be immediately re-used, such excess may be used to re-manufacture catalyst for storage. Thus, it will now be evident that processing of plant residue may proceed as usual, and earthy residue may be processed as the need for products for export from the plant arises, or, may be processed to clean up the sludge pond site.

Where earthy residue is to be processed unrelated to the re-manufacture of catalyst for the plant, it is necessary to practice only the essential steps to recover the economically valuable components of the earthy residue.

Illustrative Examples:

For the residues treated in the following illustrative examples, the average molecular composition corresponds approximately to benzoic acid ($C_7H_6O_2$). The residue herein consists essentially of acetates of Co and Mn, and HBr, the remaining organics being expressed as benzoic acid. Designations of "moles" refers to kilogram-moles (KgMoles). The percent by weight of Br and Co in the residue fed to the reactor, is maintained the same in each of the examples below, as is the reactor pressure of 10 atm. In each case, the recovered melt of metal is atomized and converted to re-manufactured catalyst.

EXAMPLE 1

Ratio of Co/Mn=1/1 in residue fed; ratio of Co/Mn=1/1 in re-manufactured catalyst; Mn in the re-manufactured catalyst is recovered from the alloy melt, the MnBr from the scrubber and the MnO from the slag.

A bath of Co/Mn/MnO/C (609/325/37/29) containing 1000 Kg of molten metal and slag is maintained at the given equilibrium composition at 2200° C. under 10 atm pressure in the reactor. Essentially all the MnO is present in the slag which forms an immiscible layer above the Co/Mn alloy. 292 Kg/hr of dry plant residue containing 2% Co, 2% Mn and 4% Br by wt, is injected into the molten alloy with oxygen. The WHSV based on Co is 0.0658 $hr^{-1}$. The equivalent rates of feed (moles/hr) are as follows: C=14.83; O=4.82 (contained in the residue); Co=0.099; and Mn=0.054 (remaining Mn introduced with the residue is in the slag as MnO, or, leaves in the reactor's effluent as $MnBr_2$). The amount of oxygen injected is about 157.9 Kg/hr (4.93 KgMoles) and effluent from the reactor is led to a water scrubber. During operation at equilibrium, about 70.4 Kg of molten alloy are withdrawn every 8 hr, and atomized to yield a powder having an average particle diameter of 100 µm, using a high pressure water stream. The composition of the particles is essentially the same as that of the melt beneath the slag.

During the same 8 hour period, 1040L (liters) of scrubber water are collected containing 76.2 Kg of $MnBr_2$ and 36.6 Kg of HBr. MnO accumulates in the slag at a rate of about 0.35 Kg/hr. Slag levels are adjusted by periodic withdrawals, and the slag withdrawn is atomized to 100 µm with a stream of water under high pressure.

The 70.4 Kg of atomized metal, 1040L of scrubber water and 119 Kg of glacial HOAc (acetic acid) are combined in a vented heated vessel, and the temperature raised to 90° C., resulting in a solution of mixed acetates and bromides of Co and Mn in which solution Co and Mn are 4.1% and 3.8% by wt, respectively. There is essentially no free acid. In an analogous manner, the atomized slag is digested with HOAc at 90° C. to yield a solution of $Mn(OAc)_2$. The desired Mn level in the re-manufactured catalyst is adjusted to Co/Mn=1/1 by addition of the required amount of this $Mn(OAc)_2$. The re-manufactured catalyst is filtered to remove suspended carbon in the alloy.

EXAMPLE 2

Ratio of Co/Mn=1/2 in residue fed; ratio of Co/Mn=1/1 in re-manufactured catalyst; Mn not wanted in the melt is rejected as MnO in slag by using enough oxygen to form the MnO.

A bath of Co/Mn/MnO/C (341/194/463/1.4) containing 1000 Kg of molten metal and slag is maintained at the given equilibrium composition at 2200° C. under 10 atm pressure in the reactor. Essentially all the MnO is present in the slag which forms an immiscible layer above the Co/Mn alloy. 292 Kg/hr of dry plant residue containing 2% Co, 4% Mn and 4% Br by wt, is injected into the molten alloy with oxygen. The WHSV based on Co is 0.01075 $hr^{-1}$. The equivalent rates of feed (moles/hr) are as follows: C=14.2; O=4.95; Co=0.099; and Mn=0.06 (remaining Mn is in the slag, or, leaves the reactor in the effluent). The amount of oxygen injected is about 150.3 Kg/hr (4.7 KgMoles) and effluent from the reactor is led to a water scrubber. During operation at equilibrium, about 73.1 Kg of molten alloy are withdrawn every 8 hr, and atomized to form a powder metal as in Example 1 above. The composition of the particles is essentially the same as that of the melt beneath the slag.

During the same 8 hour period, 1040L of scrubber water are collected containing 69.3 Kg of $MnBr_2$ and 41.2 Kg of HBr. MnO accumulates in the slag at a rate of about 7.9 Kg/hr. Slag levels are adjusted by periodic withdrawals, and the slag withdrawn is atomized to 100 µm with a stream of water under high pressure.

The 73.1 Kg of atomized metal, 1040L of scrubber water and 122 Kg of glacial HOAc are combined in a vented heated vessel, and the temperature raised to 90° C., resulting in a solution of mixed acetates and bromides of Co and Mn in which solution Co and Mn are 4.1% and 3.9% by wt, respectively. There is essentially no free acid. As in Example 1 above, if necessary, slag is digested with HOAc to yield a solution of $Mn(OAc)_2$ and as much of this solution as necessary is added to provide the desired 1/1 ratio of Co/Mn in the re-manufactured catalyst. Also as before, re-manufactured catalyst is filtered to remove suspended carbon in the alloy.

EXAMPLE 3

Recovery of substantially pure Co; ratio of Co/Mn=1/2 in residue fed. Essentially all Mn is rejected to slag by using enough oxygen.

A bath of Co/Mn/MnO/C (548/11/424/17) containing 1000 Kg of molten metal and slag is maintained at the given equilibrium composition at 1500° C. under 10 atm pressure in the reactor. Essentially all the MnO is rejected to slag which forms an immiscible layer above the molten metal. 292 Kg/hr of dry plant residue containing 2% Co, 2% Mn and 4% Br by wt, is injected into the molten alloy with oxygen. The WHSV based on Co is 0.01028 $hr^{-1}$. The equivalent rates of feed (moles/hr) are as follows: C=14.83; O=4.82; Co=0.099; and Mn=0.0022 (remaining Mn is in the slag or leaves in the effluent). The amount of oxygen injected is about 163.8 Kg/hr (5.12 KgMoles) and effluent from the reactor is led to a water scrubber. During operation at equilibrium, about 47.6 Kg of essentially pure Co ($95^+$%) are withdrawn every 8 hr. The molten metal may be cast as ingots for export from the plant, or the molten metal may be atomized as in Example 1 above to yield a powder. The composition of the metal particles is essentially the same as that of the melt beneath the slag.

During the same 8 hour period, 1040L of scrubber water are collected containing 68.4 Kg of $MnBr_2$ and 41.5 Kg of HBr. MnO accumulates in the slag at a rate of about 4.5 Kg/hr. Slag levels are adjusted by periodic withdrawals, and the slag withdrawn is atomized to 100 µm (avg. part. diam.) as in Example 1 above, for recovery of its Mn content, if desired.

EXAMPLE 4

Ratio of Co/Mn=1/1 in residue fed; ratio of Co/Mn=1/1 in re-manufactured catalyst; Mn in the re-manufactured catalyst is recovered from the alloy melt and the $MnBr_2$ from the scrubber (no MnO from the slag is converted). The effect of changing temperature and the amount of oxygen fed, is illustrated.

A bath of Co/Mn/MnO/C (662/325/8.9/2.8) containing 1000 Kg of molten metal and slag is maintained at the given equilibrium composition at 2000° C. under 10 atm pressure in the reactor. Essentially all the MnO is rejected to slag which forms an immiscible layer above the molten metal. 292 Kg/hr of dry plant residue containing 2% Co, 2% Mn and 4% Br by wt, is injected into the molten alloy with oxygen. The WHSV based on Co is $5.886 \times 10^{-3}$ $hr^{-1}$. The equivalent rates of feed (moles/hr) are as follows: C=14.83; O=4.82; Co=0.099; and Mn=0.054 (remaining Mn is in the slag or leaves in the effluent). The amount of oxygen injected is about 160.8 Kg/hr (5.03 KgMoles) and effluent from the reactor is led to a water scrubber. During operation at equilibrium, about 69.6 Kg of molten alloy are withdrawn every 8 hr, and atomized to form a powder metal as in Example 1 above. The composition of the metal powder is essentially the same as that of the melt beneath the slag.

During the same 8 hour period, 1040L of scrubber water are collected containing 90.3 Kg of $MnBr_2$ and 24.2 Kg of HBr. MnO accumulates in the slag at a rate of about 0.08 Kg/hr. Slag levels are adjusted by periodic withdrawals, and the slag withdrawn and atomized as in Example 1 above.

The 69.6 Kg of powder metal, the scrubber water and 127 Kg of glacial HOAc are combined as in Example 1, to produce a solution of mixed acetates and bromides of Co and Mn in which solution Co and Mn are 4.1% and 4.0% by wt, respectively. There is essentially no free acid. As in Example 1 above, if necessary, slag is digested with HOAc to yield a solution of $Mn(OAc)_2$ and as much of this solution as necessary is added to provide the desired 1/1 ratio of Co/Mn in the re-manufactured catalyst. Also as before, re-manufactured catalyst is filtered to remove suspended carbon in the alloy.

EXAMPLE 5

Ratio of Co/Mn=1/1 in residue fed; conditions for producing essentially pure cobalt ($99.^+$% pure) by rejecting essentially all Mn from molten metal.

A bath of Co/Mn/MnO/C (485/4.5/509.3/7) containing 1000 Kg of molten metal and slag is maintained at the given equilibrium composition at 1700° C. under 10 atm pressure in the reactor. Essentially all the MnO is rejected to slag which forms an immiscible layer above the molten metal. 292 Kg/hr of dry plant residue containing 2% Co, 2% Mn and 4% Br by wt, is injected into the molten alloy with oxygen. The WHSV based on Co is 0.0119 $hr^{-1}$. The equivalent rates of feed (moles/hr) are as follows: C=14.83; O=4.82; Co=0.099; and Mn=0.0001 (remaining Mn is in the slag or leaves in the effluent). The amount of oxygen injected is about 190.4 Kg/hr (5.95 KgMoles) and effluent from the reactor is led to a water scrubber. During operation at equilibrium, about 47.1 Kg of essentially pure Co ($99^+$%) are withdrawn every 8 hr. The molten metal may be cast as ingots for export from the plant, or the molten metal may be atomized as in Example 1 above to yield a powder. The composition of the metal particles is essentially the same as that of the melt beneath the slag.

During the same 8 hour period, 1040L of scrubber water are collected containing 65.9 Kg of $MnBr_2$ and 66 Kg of HBr. These may be stored for the re-manufacture of catalyst in the future, or exported for any other use. MnO accumulates in the slag at a rate of about 6 Kg/hr. Slag levels are adjusted by periodic withdrawals, and the slag withdrawn is atomized to 100 µm (avg. part. diam.) as in Example 1 above, for recovery of its Mn content, if desired.

EXAMPLE 6

Ratio of Co/Mn=1/3 in residue fed; melt recovered is used to re-manufacture catalyst with Co/Mn=3/1.

A bath of Co/Mn/MnO/C (285/694/0/21) containing 1000 Kg of molten metal and slag is maintained at the given equilibrium composition at 2000° C. under 10 atm pressure in the reactor. 292 Kg/hr of dry plant residue containing 2% Co, 6% Mn and 4% Br by wt, is injected into the molten alloy with oxygen. The WHSV based on Co is $5.83 \times 10^{-3}$ $hr^{-1}$. The equivalent rates of feed (moles/hr) are as follows: C=13.6; O=5.07; Co=0.099; and Mn=0.26 (remaining Mn is in the slag or leaves in the effluent). The amount of oxygen injected is about 131.1 Kg/hr (4.10 KgMoles) and effluent from the reactor is led to a water scrubber. During operation at equilibrium, about 160 Kg of molten alloy are withdrawn every 8 hr, and atomized to form a powder metal as in Example 1 above. The composition of the metal powder is essentially the same as that of the melt beneath the slag.

During the same 8 hour period, 1040L of scrubber water are collected containing 98.3 Kg of $MnBr_2$ and 18.6 Kg of HBr. No MnO accumulates in the slag. Slag levels are adjusted by periodic withdrawals.

The 160 Kg of atomized metal, 1040L of scrubber water and 329 Kg of glacial HOAc are combined as in Example 1, to produce a solution of mixed acetates and bromides of Co and Mn in which solution Co and Mn are 3.6% and 10.6% by wt, respectively. There is essentially no free acid. Also as before, re-manufactured catalyst is filtered to remove suspended carbon in the alloy.

EXAMPLE 7

Ratio of Co/Mn=1/3 in residue fed; effect of a 1% increase in gaseous oxygen fed in Example 6; result—increases MnO formed in slag and reduces carbon in the alloy; re-manufacture of catalyst with Co/Mn=1/3.

The bath maintained at the same equilibrium composition and under the same temperature and pressure conditions as in Example 6, is fed with the same amount of dry plant residue (292 Kg/hr) to provide a WHSV based on Co of $5.96 \times 10^{-3}$ $hr^{-1}$. The equivalent rates of feed (moles/hr) are as follows: C=13.6; O=5.07; Co=0.099; and Mn=0.25 (remaining Mn is in the slag or leaves in the effluent). The amount of oxygen injected is about 132.8 Kg/hr (4.15 KgMoles) and effluent from the reactor is led to a water scrubber. During equilibrium operation, the bath composition is Co/Mn/MnO/C (288/683/22/6 by wt). About 157 Kg of molten alloy are withdrawn every 8 hr, and atomized to form a powder metal as in Example 1 above. The composition of the metal powder is essentially the same as that of the melt beneath the slag.

During the same 8 hour period, 1040L of scrubber water are collected containing 99 Kg of $MnBr_2$ and 18.1 Kg of HBr. MnO accumulates in the slag at 0.45 Kg/hr. Slag levels are adjusted by periodic withdrawals.

The 157 Kg of atomized metal, the 1040L of scrubber water and 323 Kg of glacial HOAc are combined as in Example 1, to produce a solution of mixed acetates and bromides of Co and Mn in which solution Co and Mn are 3.6% and 10.5% by wt, respectively. There is essentially no free acid. As in Example 1 above, if necessary, slag is digested with HOAc to yield a solution of $Mn(OAc)_2$ and as much of this solution as necessary is added to provide the desired 1/3 ratio of Co/Mn in the re-manufactured catalyst. Also as before, re-manufactured catalyst is filtered to remove suspended carbon in the alloy.

EXAMPLE 8

Residue fed is a mixture of plant residue and earthy residue from a particular sludge pond in which there was no liner in the bottom of the pond.

A bath of Co/Mn/MnO/C (409/244/337/8.8) containing 1000 Kg of molten metal and slag is maintained at the given equilibrium composition at 1900° C. under 10 atm pressure in the reactor. Essentially all the MnO is present in the slag which forms an immiscible layer above the Co/Mn alloy. A mixture of 292 Kg/hr of dry plant residue containing 2% Co, 2% Mn and 4% Br by wt, and 38.9 Kg/hr of dry earthy residue containing 15% Co, 30% Mn, 26.2% O, 8.3% Al, 8.7% Si, and 10.3% C, by wt, is injected into the molten alloy with oxygen. The WHSV based on Co is 0.017 $hr^{-1}$. The equivalent rates of feed (moles/hr) are as follows: C=15.16; O=5.46; Co=0.2; and Mn=0.13 (remaining Mn is in the slag, or, leaves the reactor in the effluent). The amount of oxygen injected is about 154.7 Kg/hr (4.83 KgMoles) and effluent from the reactor is led to a water scrubber. During operation at equilibrium, about 149 Kg of molten alloy are withdrawn every 8 hr, and atomized to form a powder metal as in Example 1 above. The composition of the particles is essentially the same as that of the melt beneath the slag.

During the same 8 hour period, 1040L of scrubber water are collected containing 95 Kg of $MnBr_2$ and 21.3 Kg of HBr. MnO accumulates in the slag at a rate of about 9.63 Kg/hr. Slag levels are adjusted by periodic withdrawals at 8 hr intervals, and the slag withdrawn is atomized to 100 μm (avg. part. diam.) with a stream of water under high pressure.

The 149 Kg of atomized metal, the 1040 scrubber water and 323 Kg of glacial HOAc are combined in a vented heated vessel, and the temperature raised to 90° C., resulting in a solution of mixed acetates and bromides of Co and Mn in which solution Co and Mn are 7.3% and 6.3% by wt, respectively. There is essentially no free acid. As in Example 1 above, if necessary, slag is digested with HOAc to yield a solution of $Mn(OAc)_2$ and as much of this solution as necessary is added to provide a desired ratio of Co/Mn in the re-manufactured catalyst. Also as before, re-manufactured catalyst is filtered to remove suspended carbon in the alloy.

I claim:

1. A process for producing an alloy of cobalt (Co) and manganese (Mn) from a residue obtained from a process for the liquid-phase, homogeneously catalyzed oxidation of alkylaromatic compounds under pressure, to produce polycarboxylic aromatic acids, said process for producing said alloy comprising, (i) maintaining a molten metal bath of Co/Mn alloy substantially free of contaminants including oxides of metals, in a thermochemical reaction zone at a temperature above the melting point but below the boiling point of said molten alloy, under pressure in the range from about 1 bar to about 20 bar;

(ii) feeding said residue into said molten metal and concurrently contacting said molten metal with an amount of a molecular-oxygen-containing gas in an amount sufficient to convert said residue to carbon monoxide, hydrogen and metal essentially without forming oxides of Co in said molten metal, said amount of gas being determined by a desired portion of said Mn to be rejected from said molten alloy;

(iii) rejecting from said molten alloy, a desired amount of Mn to slag overlying said alloy, and into an effluent from said bath, said amount rejected being sufficient to leave molten metal containing in the range from about 0.01 part to about 500 parts Mn per 100 parts of (Co+Mn);

(iv) maintaining said residue in said thermochemical reaction zone for a period sufficient to convert essentially all carbonaceous matter in said residue, and, (v) removing gaseous effluent and a portion of said alloy from said bath.

2. The process of claim 1 wherein said Co and Mn are together present in said residue in an amount in the range from 0.1% to about 20% by weight of said residue, on a water-free basis, said residue is free of metal sulfides, phosphides or nitrides, and said reaction zone is at a temperature in the range from about 1245° C. to about 2500° C.

3. The process of claim 2 wherein, said molecular-oxygen-containing gas is oxygen, said amount of oxygen contacting said melt is a stoichiometric amount; said residue is selected from the group consisting of acetates, bromides and bromoacetates of Co and Mn, together with complexes of said alkylaromatic compounds and oxidation products thereof; and, recovering at least said Co substantially quantitatively in said molten metal.

4. The process of claim 3 wherein, said Co is present in said molten Co/Mn alloy in an amount in the range from 25 parts to about 50 parts per 100 parts by weight; and, said contaminants in said alloy include cerium (Ce), zirconium (Zr) and carbon (C) each contaminant present in an amount less than 1 part by weight.

5. The process of claim 4 wherein, said residue is selected from the group consisting of plant residue and earthy residue;

said period corresponds to a weight hourly space velocity (WHSV) in the range from $0.1 \text{ hr}^{-1}$ to $1 \times 10^{-5} \text{ hr}^{-1}$, based on Co added to said molten alloy; and, said reaction zone is at a temperature in the range from about 1500° C. to about 2350° C.

6. The process of claim 4 including, rejecting enough Mn in said residue to distribute said Mn between (i) slag overlying said molten metal and (ii) effluent leaving said bath, said slag trapping manganese oxide (MnO), and said effluent containing manganese dibromide (MnBr$_2$);

withdrawing said molten metal having a ratio of Co/Mn in the range from 1/5 to 5/1 and essentially no cobalt oxide or manganese oxide; and, recovering bromine and bromine compounds from said effluent substantially quantitatively.

7. The process of claim 4 including, rejecting essentially all Mn in said residue to distribute said Mn between (i) slag overlying said molten metal, and (ii) effluent leaving said bath, said slag trapping manganese oxide (MnO), and said effluent containing manganese dibromide (MnBr$_2$);

withdrawing substantially pure molten Co having essentially no cobalt oxide or manganese oxide in said molten Co; and, recovering bromine and bromine compounds from said effluent substantially quantitatively.

8. The process of claim 3 including, comminuting said molten metal to produce a powder metal having an average particle diameter in the range from 1 μm to about 500 μm; and, contacting said powder metal with an acid selected from the group consisting of acetic acid and hydrobromic acid at conditions which yield corresponding salts.

9. The process of claim 4 including, comminuting said slag to produce a powder slag having an average particle diameter in the range from 1 μm to about 500 μm; and, contacting said powder slag with an acid selected from the group consisting of acetic acid and hydrobromic acid at conditions which yield corresponding salts.

10. A process for recovering a substantially pure cobalt (Co) melt from a residue obtained from a process for the liquid-phase, homogeneously catalyzed oxidation of alkylaromatic compounds to produce polycarboxylic aromatic acids under pressure, said process for recovering said Co melt comprising, (i) maintaining substantially pure molten Co with less than 10% contaminants in a thermochemical reaction zone at a temperature above 1495° C. but below the boiling point of said molten Co, under pressure in the range from about 1 bar to about 20 bar, said contaminants including cerium (Ce), zirconium (Zr) and carbon (C) each contaminant present in an amount less than 1 part per 100 parts of Co by weight;

(ii) feeding said residue into said molten Co in combination with a molecular-oxygen-containing gas in an amount sufficient to convert essentially all carbon in said residue to carbon monoxide (CO) while forming essentially no oxide of Co;

(iii) converting compounds of cobalt in said residue into molten Co while maintaining a single phase molten metal in said bath, and concurrently discharging manganese dibromide (MnBr$_2$) from said bath;

(iv) maintaining said residue in said thermochemical reaction zone for a period sufficient to convert essentially all carbonaceous matter in said residue;

(v) removing said effluent from said reaction zone, and, (vi) removing a portion of said substantially pure molten Co from said bath.

11. The process of claim 10 wherein said Co and Mn are together present in said residue in an amount in the range from 0.1% to about 20% by weight of said residue, on a water-free basis, and said residue is free of metal sulfides, phosphides or nitrides, and including removing a portion of slag.

12. The process of claim 11 wherein said molecular-oxygen-containing gas is oxygen, said amount of oxygen contacting said melt is a stoichiometric amount, and said residue is selected from the group consisting of acetates, bromides and bromoacetates of Co and Mn, together with complexes of said alkylaromatic compounds and oxidation products thereof, and said Co is recovered substantially quantitatively.

13. The process of claim 12 wherein, said residue is selected from the group consisting of plant residue and earthy residue;

said period corresponds to a weight hourly space velocity (WHSV) in the range from $0.1 \text{ hr}^{-1}$ to $1 \times 10^{-5} \text{ hr}^{-1}$, based on Co added to said molten alloy; and, said reaction zone is at a temperature in the range from about 2000° C. to about 2500° C.

14. The process of claim 13 wherein said residue is plant residue and said WHSV is in the range from $10^{-2} \text{ hr}^{-1}$ to about $10^{-4} \text{ hr}^{-1}$.

* * * * *